(12) United States Patent
Fujimoto et al.

(10) Patent No.: US 6,199,675 B1
(45) Date of Patent: Mar. 13, 2001

(54) LOCK-UP PISTON IN A TORQUE CONVERTER

(75) Inventors: Shinji Fujimoto; Hiroshi Kimura, both of Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/379,907

(22) Filed: Aug. 24, 1999

(30) Foreign Application Priority Data

Aug. 27, 1998 (JP) .................................................. 10-241309

(51) Int. Cl.$^7$ ................................................. F16G 45/02
(52) U.S. Cl. .......................................... 192/3.29; 192/213
(58) Field of Search .................................. 192/3.28, 3.29, 192/212, 213, 107 R

(56) References Cited

U.S. PATENT DOCUMENTS

| | | | |
|---|---|---|---|
| 4,809,830 | * | 3/1989 | Schierling et al. .................. 192/3.29 |
| 4,934,495 | * | 6/1990 | Lemon ............................. 192/3.29 X |
| 6,079,529 | * | 6/2000 | Hinkel et al. ..................... 192/3.29 X |
| 6,079,531 | * | 6/2000 | Ohkubo et al. ...................... 192/3.29 |

FOREIGN PATENT DOCUMENTS

19622691 * 12/1996 (DE) .

* cited by examiner

Primary Examiner—Charles A. Marmor
Assistant Examiner—Saúl Rodriguez
(74) Attorney, Agent, or Firm—Shinjyu Global IP Counselors, LLP

(57) ABSTRACT

A piston (2) is disposed between a front cover and a turbine of a torque converter and is adapted to move in an axial direction in response to changes in the hydraulic fluid pressure. The piston (2) includes a disc-shaped plate portion (11), a flat annular portion (12), and an annular rim portion (13). The flat annular portion (12) is formed at an outer periphery of the disc-shaped plate (11), and is adapted to frictionally engage a portion of the front cover. The annular rim portion (13) is formed on an outer peripheral edge of the flat annular portion (12) and extends axially toward the turbine. The annular rim portion (13) supports the radial outer side of torsion springs disposed on an inner periphery thereof. By forming notches (14) in the annular rim portion (13), the rigidity of the flat annular portion (12) is reduced. Reducing the rigidity of the flat annular portion (12) makes the flat annular portion (12) more flexible so that upon engagement with the front cover, the flat annular portion (12) may more readily conform to the shape of the front cover in the event that the front cover is formed with irregularities or slightly undulating surfaces.

2 Claims, 9 Drawing Sheets

LOCK-UP PISTON IN A TORQUE CONVERTER

BACKGROUND OF THE INVENTION

A. Field of the Invention

The present invention relates to a lock-up piston in a torque converter, and more particularly to a piston that includes a disc-shaped portion and an annular tube-shaped portion formed on an outer periphery of the disc-shaped portion, the annular tube-shaped portion extending in an axial direction.

B. Description of the Related Art

A torque converter is a device which has three types of internal vaned wheels: an impeller, a turbine and a stator. Torque converters typically configured to transmit torque via movement of hydraulic fluid within the device. A torque converter typically includes a front cover that is fixed to the impeller. The impeller typically includes an impeller shell welded to the front cover, and a plurality of impeller blades. The front cover is coupled to a torque producing mechanism, such as the crankshaft of an engine. The turbine is typically coupled to a transmission shaft. Torque is transmitted from the front cover to the impeller, the blades of the impeller urge the hydraulic fluid toward the turbine causing the turbine to rotate, and the turbine causes the transmission shaft to rotate.

A lock-up clutch within the torque converter is disposed between the turbine and the front cover. The lock-up clutch is typically coupled to the turbine for rotation therewith. When the lock-up clutch is engaged with the front cover, torque is directly transmitted from the front cover to the turbine.

Usually, the lock-up clutch includes a piston that can be brought into contact with the front cover in response to fluid pressure changes. The piston typically includes an annular flat portion on an outer peripheral portion thereof, the annular flat portion having an annular shaped frictional facing fixed thereto. A retaining plate is fixed to a portion of the piston for supporting a torsion spring that elastically couples the piston to a driven plate that is connected to the turbine.

The piston is selectively moved in an axial direction in and out of engagement with the front cover by changes in hydraulic fluid pressure within portions of the torque converter. When the annular shaped frictional facing fixed on the outer periphery of the piston is in direct contact with a corresponding frictional surface of the front cover, torque from the front cover is transmitted through the lock-up clutch to the turbine.

Preferably, the frictional surface of the front cover should be flat. In reality, however, undulations and irregularities caused by, for instance, welding, sometimes develop in the frictional surface. With such undulations present, when the friction facing of the piston is in contact with the frictional surface of the front cover, the rigidity of the piston prevents complete planar surface to surface contact between the frictional surface on the front cover and the frictional facing on the piston. Specifically, only the undulated portions of frictional surface of the front cover closest to the piston make contact with the frictional facing on the piston. As a result, the performance of the lock-up clutch is degraded and slippage of the lock-up clutch may occur. Therefore, under such circumstances, the lock-up clutch is unable to operate properly and may not sufficiently absorb or dampen vibrations during slippage of the lock-up clutch, and further may not transmit torque to the turbine in an efficient manner due to the slippage.

Further, in a known configuration of a piston of a lock-up clutch, the piston is formed on an outer radial periphery thereof with an annular rim or tubular portion which restricts radially outward movement of torsion springs. Typically the torsion springs are moved radially outward by centrifugal force. Therefore, such an annular rim or tubular portion is necessary to retain the torsions springs. Unfortunately, such an annular rim or tubular portion provides the piston with even greater rigidity, thereby further adding to the problems discussed above.

SUMMARY OF THE INVENTION

An object of the present invention is to improve the frictional engagement performance of a piston of a lock-up clutch by making the portion of the piston that undergoes friction engagement more flexible.

In accordance with one aspect of the present invention, a lock-up piston in lock-up clutch of a torque converter includes a disc-shaped member. The disc-shaped member includes a central disc-shaped plate portion, an flat annular portion formed at the outer periphery of the disc-shaped plate portion, and an annular rim portion formed at an outer peripheral edge of the flat annular member. The flat annular portion is configured for frictional engagement with a front cover of the torque converter and the annular rim portion extends in an axial direction towards a turbine side of the torque converter. The lock-up piston is configured such that the flat annular portion is more flexible that the central disc-shaped plate portion.

Since the flat annular portion has a lower rigidity than the disc-shaped plate portion, when the flat annular portion frictionally engages the front cover, the flat annular portion is able to conform to the shape of the front cover. Therefore, if the front cover has irregularities or an undulating surface, the flat annular portion may still make reliable frictional engagement therewith. As a result, the friction performance of the lock-up piston is improved. Since the central disc-shaped plate portion can maintain the same rigidity as that of a prior art central disc-shaped plate portion, the piston has sufficient strength to withstand the hydraulic fluid pressure exerted on the piston.

Preferably, in one embodiment of the invention, the flat annular portion of the lock-up piston has a thinner plate thickness than the central disc-shaped plate portion.

Preferably, the plate thickness of the flat annular portion of the lock-up piston is in the range from 50 to 80% of the plate thickness of the central disc-shaped plate portion.

Alternatively, a thickness of the annular rim portion is thinner than the thickness of the disc-shaped plate portion.

Preferably, the thickness of the annular rim portion is in the range from 50 to 80% of the thickness of the disc-shaped plate portion.

Alternatively, a plurality of apertures are formed in the annular rim portion.

Preferably, the plurality of apertures is in the form of a plurality of notches opened axially toward the turbine.

Preferably, an axial length of the notches is in the range from 30 to 90% of an axial length of the annular rim portion.

Preferably, a sum of circumferential length of all of the plurality of notches is no greater than 30% of a circumferential length of the annular rim portion.

Preferably, the circumferential length of each of the notches is in a range from 5 to 20 mm.

Alternatively, the plurality of apertures is in the form of a plurality of holes closed on an axial end of the annular rim portion close to the turbine.

Preferably, each of the holes has a circumferential length larger than an axial length thereof.

Preferably, the axial length of each of the holes is in a range from 20 to 70% of an axial length of the annular rim portion.

Preferably, a sum of circumferential lengths of the plurality of holes is in the range from 50 to 80% of the circumferential length of the annular rim portion.

In each of the above configurations and embodiments, the flat annular portion is more flexible than in prior art configuration making it possible for more reliable contact with possibly uneven surfaces on a front cover of a torque converter.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE INVENTION

First Embodiment

Figure 1:
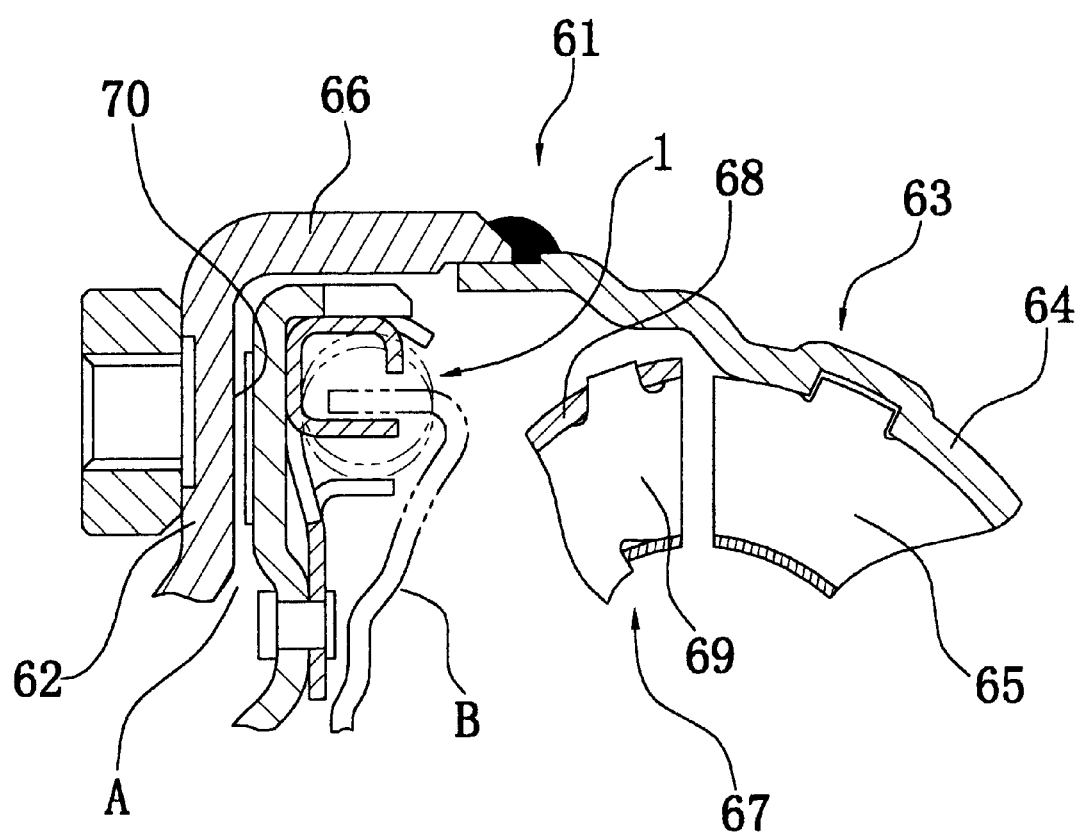
FIG. 1 is a fragmentary, cross-sectional side view of a torque converter in accordance with a first embodiment of the present invention, showing portions of a front cover, impeller, turbine and lock-up clutch.

FIG. 1 is a fragmentary cross-sectional view of a torque converter 61 which employs a lock-up clutch 1 in a first embodiment of the present invention. The cross-sectional view of the torque converter 61 is fragmentary, but it should be understood that an impeller 63, turbine 67 and front cover 62 are well known structures. During usage of the torque converter 61, an engine (not shown) would be disposed on the left side of FIG. 1 and would be coupled to the front cover 62. A transmission (not shown) would be disposed on the right side of FIG. 1. In the description below, the term transmission side refers to the right side of FIG. 1 and the term engine side refers to the left side of FIG. 1. R1 in FIG. 3 indicates the direction of rotation of the torque converter 61 and the lock-up clutch 1. R2 in FIG. 3 refers to a rotational direction opposite the direction of rotation of the torque converter 61.

The torque converter 61 is a mechanism for transmitting the torque from a crankshaft of the engine on the engine side to a main drive shaft of the transmission. The torque converter 61 includes the front cover 62 and the impeller 63, mentioned above. The front cover 62 and the impeller 63 are fixed to one another thereby forming an annular fluid filled chamber. The torque converter 61 has three types of vaned wheels disposed within the annular chamber, specifically, the impeller 63, the turbine 67 and a stator (not shown). Also within the annular chamber of the torque converter 61 is a lock-up clutch 1.

The front cover 62 is a disc-shaped member and has an outer peripheral annular rim 66 formed on the outer periphery of the front cover 62. The annular rim 66 extends in an axial direction towards the transmission side. The outer peripheral annular rim 66 is fixed by welding to an impeller shell 64 of the impeller 63. In the impeller 63, a plurality of impeller blades 65 are fixed to an inner surface of the impeller shell 64. The turbine 67 is disposed adjacent to the impeller 63 inside the annular fluid filled chamber. The turbine 67 includes a turbine shell 68 and a plurality of turbine blades 69 fixed to an inner surface of the turbine shell 68 facing the impeller 63.

The lock-up clutch 1 is disposed in a portion of the fluid filled chamber between the front cover 62 and the turbine 67. The lock-up clutch 1 has a disc shape and divides the above mentioned portion of the fluid filled space into a first hydraulic pressure chamber A and a second hydraulic pressure chamber B. The second hydraulic pressure chamber B is located between the lock-up clutch 1 and the turbine 67, and the first hydraulic pressure chamber A is located between the lock-up clutch 1 and the front cover 62.

In order to control engagement and dis-engagement of the lock-up clutch 1, the pressure of hydraulic fluid in the first hydraulic pressure chamber A is manipulated. Specifically, the fluid pressure in the second hydraulic pressure chamber B is increased in order to engage the lock-up clutch 1 with the front cover 62, and the fluid pressure in second hydraulic pressure chamber B is decreased in order to dis-engage the lock-up clutch 1.

In order to dis-engage the lock-up clutch 1, hydraulic fluid flows radially outward into the second hydraulic pressure chamber B, and then flows to the torus space through a gap between outer radial portions of the impeller 63 and the turbine 67. Since the hydraulic pressure in the first hydraulic pressure chamber A is higher than the hydraulic pressure in the second hydraulic pressure chamber B, the lock-up clutch 1 moves toward the transmission side in the axial direction and clutch engagement is released. In order to engage the lock-up clutch 1, the hydraulic fluid in the first hydraulic pressure chamber A is drained, the hydraulic pressure in the second hydraulic pressure chamber B becomes greater than the hydraulic pressure in the first hydraulic pressure chamber A, and hence the lock-up clutch 1 moves toward the engine side in the axial direction. As a result, a friction facing of the lock-up clutch 1 is pushed into engagement with a frictional surface 70 of the front cover 62, and the torque of the front cover 62 is input to the lock-up clutch 1.

It should be understood that other portions of the torque converter 61, not shown in FIG. 1, may include any of a variety of known configurations. In other words, the present invention is directed specifically to the configuration of a lock-up clutch configured to be installed in any of a variety of torque converters.

Figure 2:
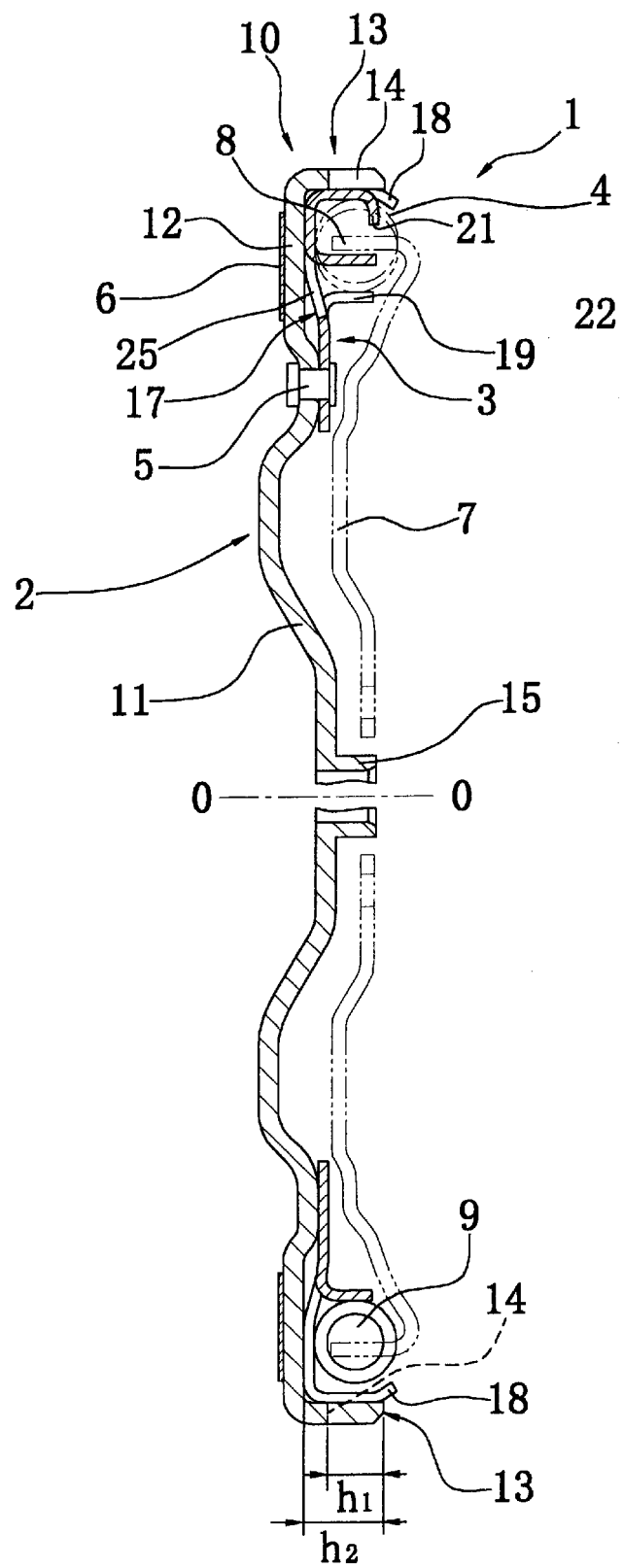
FIG. 2 is a fragmentary, cross-sectional side view of the lock-up clutch shown removed from the torque converter depicted in FIG. 1.
Figure 3:
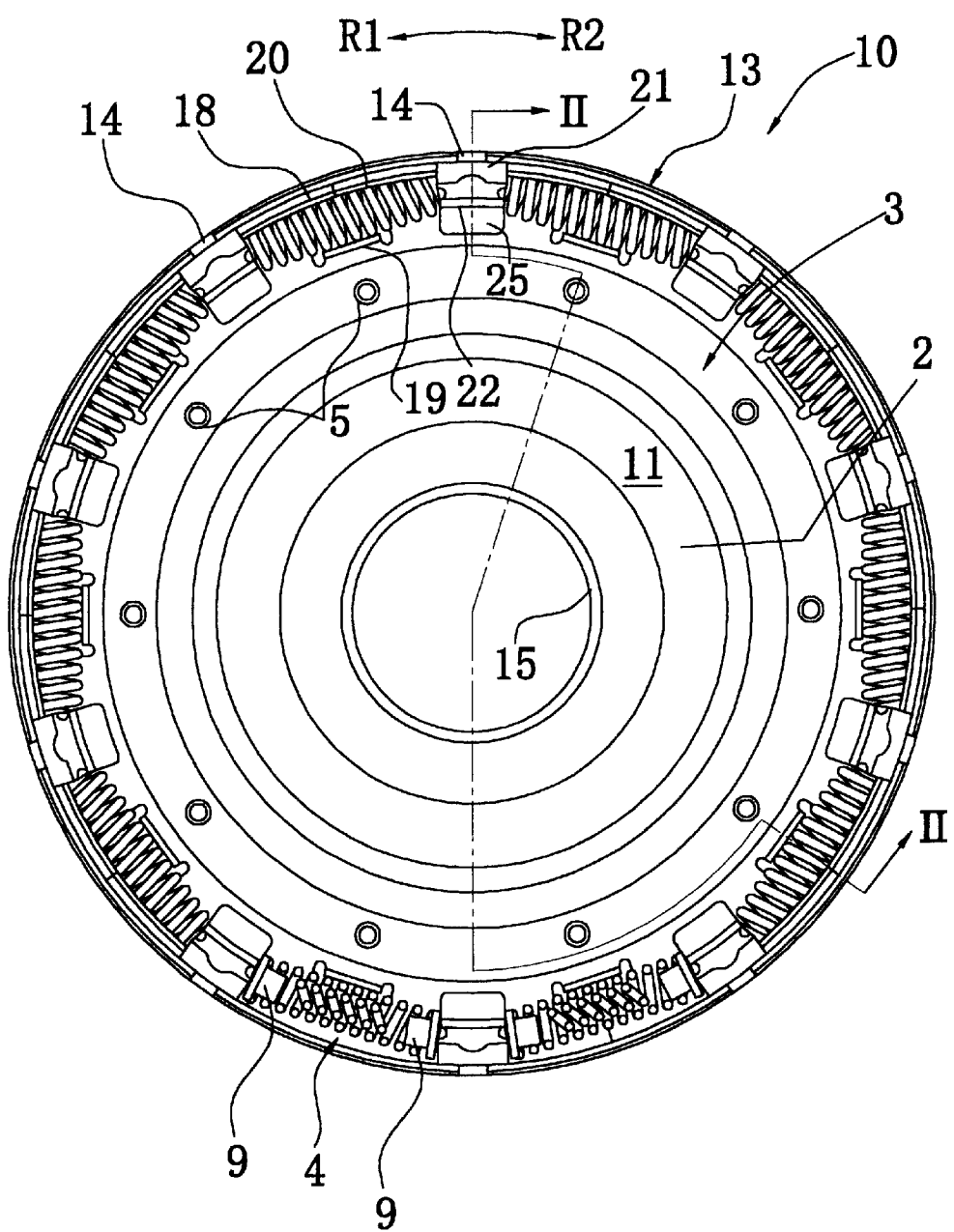
FIG. 3 is an end elevational view of the lock-up clutch depicted in FIGS. 1 and 2.
Figure 4:
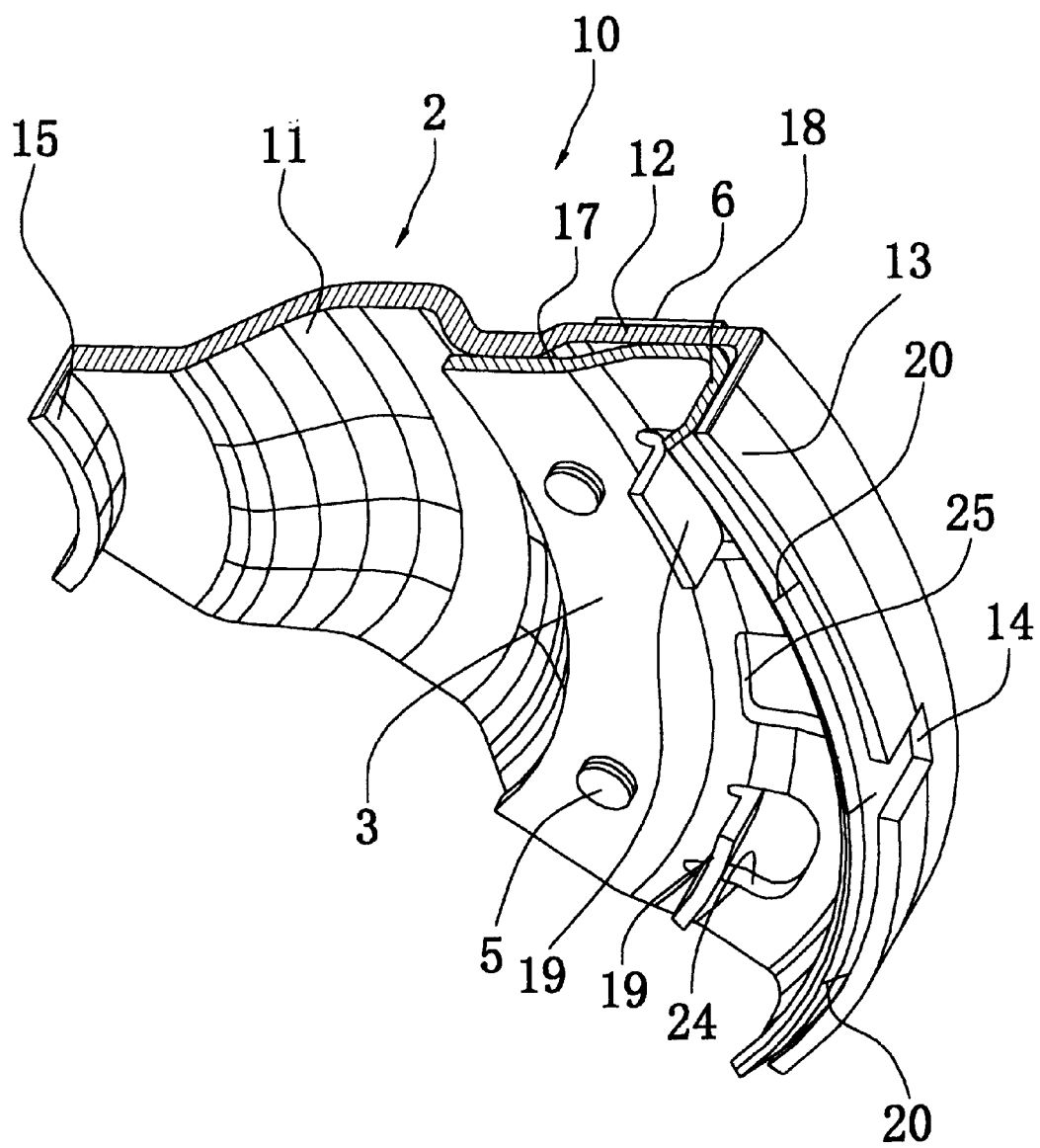
FIG. 4 is a fragmentary perspective view of portions of the lock-up clutch depicted in FIGS. 1, 2 and 3.

As shown in FIGS. 2, 3 and 4, the lock-up clutch 1 primarily includes a disc-shaped piston 2, a retaining plate 3, a plurality of torsion springs 4, and a driven plate 7.

The disc-shaped piston 2 is configured to engage and disengage the front cover 62, and functions as an input member for inputting torque into the lock-up clutch 1. The disc-shaped piston 2 has a plate or disc shaped with a hole formed in its center. The disc-shaped piston 2 is made from a metal plate material such as sheet metal. The disc-shaped piston 2 primarily includes a disc-shaped plate 11, a flat annular portion 12 (friction coupling part) formed on a radially outward portion of the disc-shaped plate 11, and an annular rim portion 13 formed at an outer peripheral edge of the flat annular portion 12. The disc-shaped plate 11, flat annular portion 12, and annular rim portion 13 each have a generally uniform plate thickness.

The disc-shaped piston 2 is formed from a plate material, such as sheet metal, by deforming or pressing the material into the shape depicted in the drawings, with the disc-shaped plate 11, flat annular portion 12, annular rim portion 13 and an annular inner peripheral rim 15. The annular inner peripheral rim 15 extends axially toward the transmission side and is formed on an inner peripheral edge of the disc-shaped plate 11. The annular inner peripheral rim 15 is shaped to contact an outer peripheral surface of a turbine hub (not shown), such that the disc-shaped piston 2 is supported on the turbine hub. However, the disc-shaped piston 2 is rotatable and axially movably relative to the turbine hub.

The flat annular portion 12 has a flat, planar shape. The annular inner peripheral rim 15 and the annular rim portion 13 are perpendicular to the flat annular portion 12. The friction facing 6 is bonded to the flat annular portion 12 facing the frictional surface 70 of the front cover 62.

The annular rim portion 13 extends from the outer peripheral edge of the flat annular portion 12 axially toward the transmission side. The annular rim portion 13 is formed with an annular shape throughout its entire circumference. The annular rim portion 13 is constructed to support loads generated as the torsion springs (described below) are urged radially outwards against the annular rim portion 13 by centrifugal force. In addition, notches 14 (described in greater detail below with respect to FIG. 4) are formed on the annular rim portion 13. The notches 14 are formed by cutting away a portion of the annular rim portion 13, as indicated in FIG. 4, A plurality of circumferentially spaced apart notches 14 are formed on the annular rim portion 13.

The annular rim portion 13 is an outer peripheral wall provided at the outer peripheral edge of the flat annular portion 12. The annular rim portion 13 extends in the axial direction only a predetermined distance and has a flat ring shape.

A retaining plate 3 is disposed on an transmission side of the flat annular portion 12, radially inside the annular rim portion 13. The retaining plate 3 is an annular member made from a metal plate material, such as sheet metal. The retaining plate 3 surrounds the torsion springs 4, as is described further below. The retaining plate 3 includes a disc-shaped plate portion 17 and an annular ring portion 18. The inner periphery of the disc-shaped plate portion 17 of the retaining plate 3 is fixed to the disc-shaped piston 2 by a plurality of rivets 5. The annular ring portion 18 extends from the outer peripheral edge of the disc-shaped plate portion 17 towards the transmission side. The annular ring portion 18 extends along an inner surface of the annular rim portion 13 and is adjacent thereto. The annular ring portion 18 may be spaced apart slightly from the inner peripheral surface of the annular rim portion 13 or, alternatively, the annular ring portion 18 may be in contact with the inner peripheral surface of the annular rim portion 13.

The edge of the annular ring portion 18 (on the transmission side thereof) is slightly bent radially inward forming a retaining lip for the elastic members. Further, the annular ring portion 18 includes a plurality of bent portions 21 that extend radially inward toward the center of the piston 2. The bent portions 21 are formed at equally spaced location in the circumferential direction on the annular ring portion 18. The bent portions 21 are formed by cutting a portion of the annular ring portion 18 and bending the cut portion radially inward.

The disc-shaped plate portion 17 of the retaining plate 3 is also formed with first protrusions 22. The first protrusions 22 are formed at circumferential locations that correspond to the locations of the bent portions 21. In other words, the bent portions 21 and the first protrusions 22 are located at equally spaced apart locations about the retaining plate 3 in matched pairs. The first protrusions 22 are formed by cutting and bending the cut portion of the disc-shaped plate portion 17 such that the cut portions extend toward the transmission side. Holes 25 are formed on the disc-shaped portion 17 adjacent to the first protrusion 22.

The disc-shaped plate portion 17 of the retaining plate 3 is also formed with second protrusions 19 at locations circumferentially between adjacent pairs of the first protrusion 22, as is shown in FIG. 3. The second protrusions 19 are formed by cutting portions of the disc-shaped plate portion 17 and bending the cut portion such that it extends towards the transmission side. Holes 24 are formed as a result of the cutting and bending that formed the second protrusions 19.

Slits 20 are formed on the edge of the annular ring portion 18 at circumferential locations corresponding to circumferential centers of the second protrusions 19, midway between adjacent pairs of the first protrusion 22. The circumferential width of the slits 20 is smaller than the diameter of any coil of the torsion springs 4. Additionally, the slits 20 extend to the holes 24 that were formed by the cutting that helped to form the second protrusion 19.

The torsion springs 4 elastically couple the disc-shaped piston 2 to the driven plate 7 in a rotating direction (a circumferential direction). Each torsion spring 4 is disposed in a circumferentially extending space between a first protrusion 22 of the retaining plate 3 and the adjacent bent portion 21. As a result, circumferential ends of the torsion springs 4 are in contact with and are supported by the bent portions 21 and the first protrusion 22. The torsion springs 4 are supported on a radially outer side thereof by the annular ring portion 18. The torsion springs 4 are supported on a radially inner side thereof by the second protrusion 19. Thus, the torsion springs 4 are supported on both radial sides thereof, on the axial engine side thereof and at both circumferential ends thereof by the retaining plate 3.

Each torsion spring 4 is a combination of two coil springs, a large coil spring and a small coil spring. The small coil spring is disposed inside the large coil spring, and the circumferential length of the small coil spring is smaller than the circumferential length of the large coil spring. Consequently, when the torsion springs 4 are compressed in the direction of rotation, a 2-stage characteristics can be achieved. A spring seat 9 is disposed at each circumferential end of each torsion spring 4. The spring seats 9 engage the bent portions 21, the first protrusion 22, and claws 8 (described in greater detail below) for transmitting torque.

The driven plate 7 is a disc-shaped member that is disposed axially between the disc-shaped piston 2 and the turbine 67. The driven plate 7 is formed with a claw 8 on an outer peripheral edge thereof. The claw 8 contacts circumferential ends of circumferentially adjacent torsion springs 4. Each claw 8 extends in an axially direction into a gap defined between the bent portion 21 and the first protrusion 22. The inner peripheral edge of the driven plate 7 extends radially inward near the annular inner peripheral rim 15 of the disc-shaped piston 2. The inner periphery of the driven plate 7 is fixed to the turbine hub (not shown). Alternatively, the driven plate 7 can be fixed to an outer periphery of the turbine shell.

Next, the notches 14 in the annular rim portion 13 are described. The notches 14 are formed in the annular rim portion 13 in order to reduce the rigidity of the flat annular portion 12 but do not significantly reduce the ability of the annular rim portion 13 to support the torsion springs. In other words, the notches 14 provide a predetermined amount of flexibility to the flat annular portion 12, but do not compromise the strength of the annular rim portion 13.

The annular rim portion 13 is divided into a plurality of section in the circumferential direction by the notches 14. Therefore, the annular rim portion 13 and the flat annular portion 12 are easily bent about the notches 14. Each notch 14 is disposed circumferentially between adjacent slits 20. In other words, the slits 20 and the notches 14 are alternately disposed in the circumferential direction on the annular rim portion 13. The notches 14 are located radially outward from the bent portions 21 and the first protrusion 22. In other words, the notches 14 are not located adjacent to any of the torsion springs 4. Circumferential edges of each notch 14 extend straight in substantially axial direction providing each notch 14 with a square shape, but the notches 14 may alternatively have a trapezoidal shape.

As shown in FIG. 2, each notch 14 has an axial length h1 that is in the range of 30 to 90% of an axial length h2 of the annular rim portion 13. If the length h1 is less than 30%, the depth becomes too small so a sufficient decrease in the rigidity of the flat annular portion 12 is not achieved. If the length exceeds 90%, sufficient strength cannot be maintained to support the centrifugal loads from the torsion springs 4 during rotation of the torque converter.

Preferably, the sum of circumferential lengths of all of the notches 14 is less than 30% of the circumferential length of the entire annular rim portion 13. Because the rigidities of the annular rim portion 13 and the flat annular portion 12 can be sufficiently reduced by the notches 14, the percentage of the circumference of the notches 14 does not have to increase above 30%.

Each notch 14 has a circumferential length that is in the range from 5 to 20 mm, in the depicted embodiment. If a plurality of notches 14 are provided in the circumferential direction, the circumferential length of each notch 14 does not have to be greater than 20 mm. Also, if each notch 14 has a circumference of at least 5 mm, a sufficient effect is demonstrated in the reduction of the rigidities of the annular rim portion 13 and the flat annular portion 12.

The structure of the lock-up clutch 1 described above is now described from another point of view. The disc-shaped piston 2, retaining plate 3, and annular rim 13 form a lock-up clutch piston assembly 10, which rotates as a single unit. The piston assembly 10 functions as an input member of the lock-up clutch 1 and also includes dampening capabilities, due to the torsion springs 4. The driven plate 7 functions as an output member of the lock-up clutch 1. The torsion springs 4 are elastic members that engage both the input member and the output member in the rotational direction.

Next, operation of the lock-up clutch 1 is described.

Torque from the crankshaft (not shown) on the engine side is transmitted to a flexible plate (not shown) that is connected to the front cover 62. As a result, the impeller 63 rotates and the hydraulic fluid flows from the impeller 63 to the turbine 67. The flow of the hydraulic fluid rotates the turbine 67, then the torque of the turbine 67 is transmitted to the main drive shaft (not shown).

When the speed ratio of the torque converter 61 increases and the speed of the main drive shaft reaches a constant rotational speed, the hydraulic fluid in the first hydraulic pressure chamber A between the disc-shaped piston 2 and the front cover 62 is drained through the interior of the transmission shaft (not shown) in a manner known in the art. As a result, the disc-shaped piston 2 moves toward the front cover 62 due to the differences in the hydraulic fluid pressure between the first hydraulic pressure chamber A and the second hydraulic pressure chamber B. As a result, the friction facing 6 is pushed into the frictional surface 70 of the front cover 62. Therefore, the torque of the front cover 62 is transmitted from the disc-shaped piston 2 through the retaining plate 3 and the torsion spring 4 to the driven plate 7. The torque is output from the driven plate 7 to the main drive shaft (not shown). Specifically, the front cover 62 is mechanically coupled to the turbine 67, and the torque of the front cover 62 is directly transmitted to the turbine 67 and hence to the transmission shaft (not shown). As the disc-shaped piston 2 contact the front cover 62, the flat annular portion 12 is able to flex due to the notches 14 and can conform to the shape of the frictional surface 70, thereby ensuring a reliable frictional engagement between the frictional facing 6 and the frictional surface 70.

The lock-up clutch 1 transmits torque, and absorbs and dampens torsional vibrations transmitted from the front cover 62. Specifically, if torsional vibrations are transmitted from the front cover 62 to the lock-up clutch 1, the torsion springs 4 are compressed between the retaining plate 3 and the driven plate 7. More specifically, the torsion springs 4 are compressed in the circumferential direction between the bent portions 21 and the first protrusion 22 and the claws 8. The torsion springs 4 expand to their original shapes after compression, then the above operation is repeated.

As described above, when the torsional vibrations are input and the torsion springs 4 are repeatedly compressed and expanded, the torsion springs 4 are urged radially outward by centrifugal force and contact the annular ring portion 18 of the retaining plate 3. That is, the radially outward forces act on the annular ring portion 18. The portions of the annular ring portion 18 that may contact the torsion springs 4 are divided into two sections by the slits 20. Therefore, the degree of stress concentration applied thereto when forces act thereon is lowered. As a result, even if the plate thickness is thinner than that of a conventional retaining plate, a lifetime of the retaining plate 3 prolonged, and also the weight of the lock-up clutch 1 can be made lighter.

The annular ring portion 18 is supported on the outer periphery by the annular rim portion 13. Namely, centrifugal forces acting on the torsion springs 4 are supported by the annular rim portion 13 through the annular ring portion 18. Since notches 14 are spaced apart from the torsion springs 4, the annular rim portion 13 has sufficient strength to support the torsion springs 4.

The rigidity of the flat annular portion 12 is significantly reduced by the notches 14. Therefore, even if the frictional surface 70 is imperfect with, for instance, undulations or irregularities, the flat annular portion 12 in the clutch engaged state has sufficient flexibility to conform to the shape of the frictional surface 70. Compared to a conventional annular portion, the flat annular portion 12 can engage the frictional surface 70 more closely. Thus, the frictional engagement performance between the frictional surface 70 and the friction facing 6 improves, and the vibrations become smaller. Especially when slip control is used, reduction of vibrations is particularly effective.

In the first embodiment described above, by reducing the rigidity of the annular rim portion 13, the rigidity of the flat annular portion 12 (friction coupling part) in the disc-shaped piston 2 is reduced. Therefore, the plate thickness of the flat annular portion 12 and the annular rim 13 may be the same as the thickness of a conventional annular members. Particularly, the strength of the disc-shaped member does not decrease, and the strength against the hydraulic pressure of the entire piston is not significantly reduced.

Second Embodiment

Figure 5:
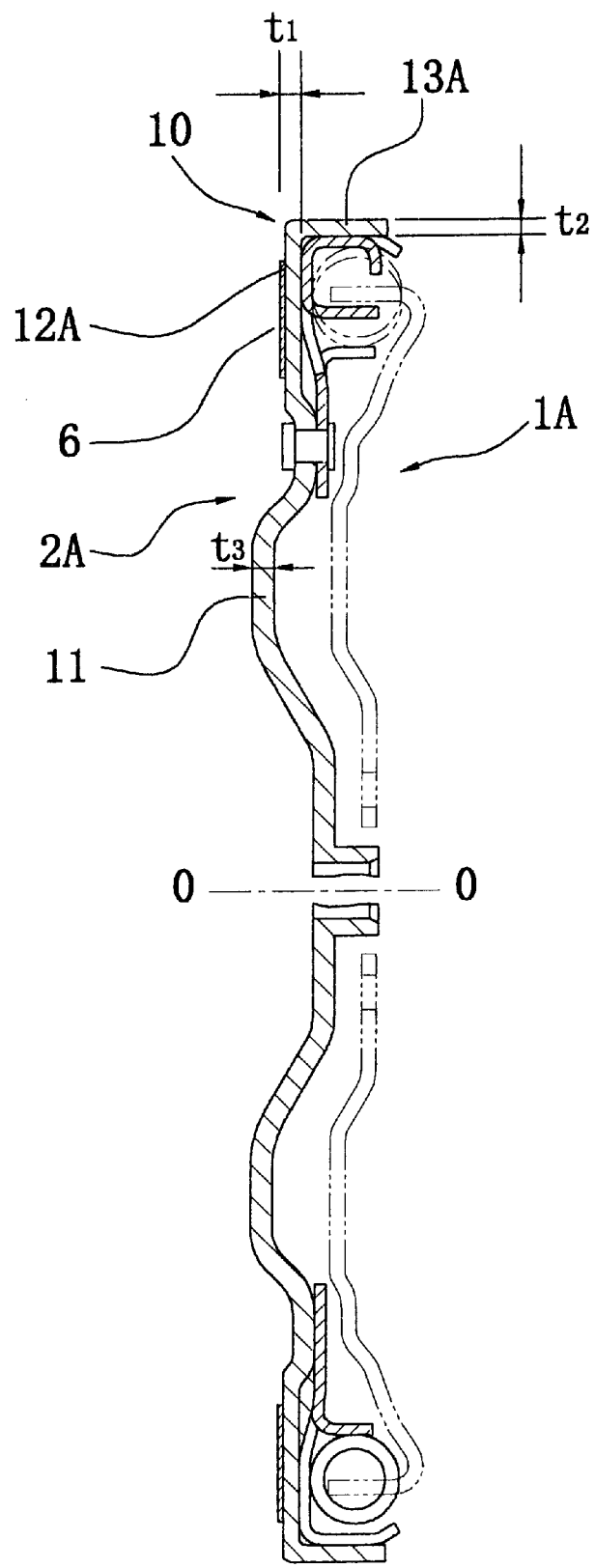
FIG. 5 is a fragmentary, cross-sectional side view, similar to FIG. 2, showing details of a lock-up clutch in accordance with a second embodiment of the present invention.
Figure 6:
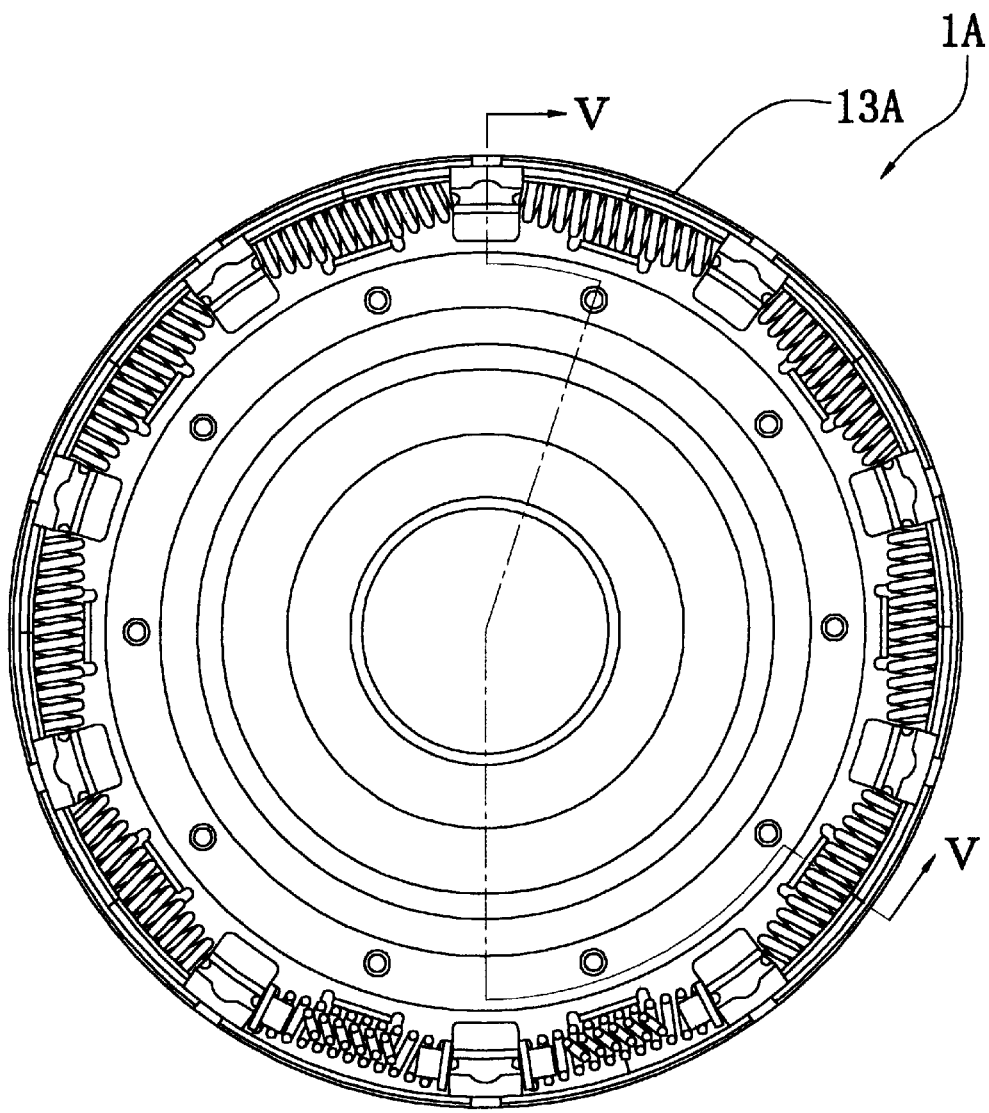
FIG. 6 an end elevational view of the lock-up clutch depicted in FIG. 5.
Figure 7:
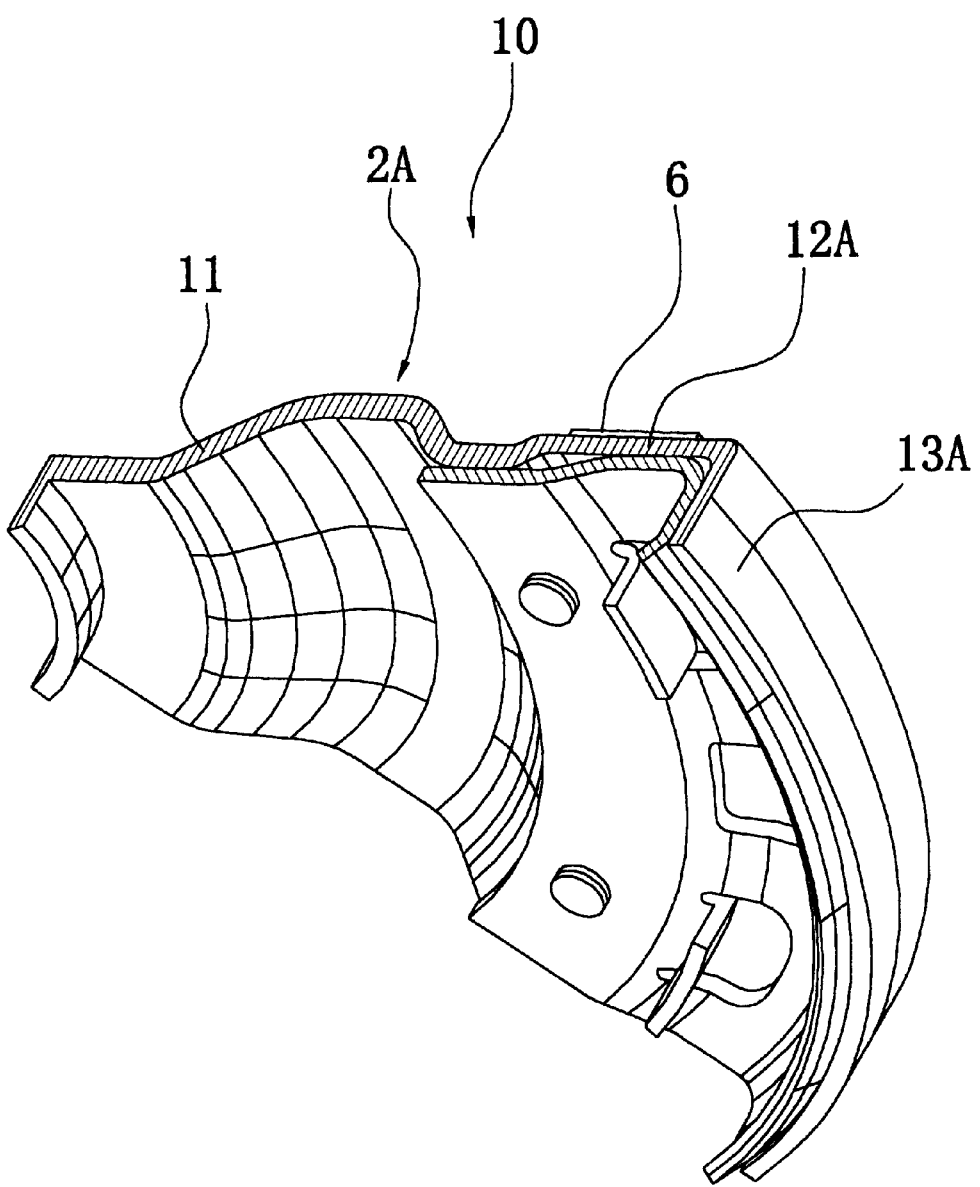
FIG. 7 is a fragmentary perspective view of portions of the lock-up clutch depicted in FIGS. 5 and 6.

The lock-up clutch 1 in accordance with a second embodiment is described with reference to FIGS. 5, 6 and 7. Many of the elements described above with respect to the first embodiment are present in the second embodiment having the same reference numerals as the elements described above. Therefore, where like reference numerals are used, the description of such elements is the same as in the first embodiment.

In the second embodiment, a lock-up clutch 1A has a disc-shaped piston 2A that a flat annular portion 12A having a plate thickness t1, an annular rim portion 13A having a plate thickness t2 and a disc-shaped plate 11 having a plate thickness t3. The thicknesses t1 and t2 are smaller that the plate thickness t3 of the disc-shaped plate 11. Because of the difference in thicknesses, the rigidity of the flat annular portion 12A is significantly less than that of a conventional annular member. On the other hand, since the disc-shaped plate 11 maintains the same plate thickness as that of a conventional disc-shaped plate, the strength of the entire piston against the hydraulic pressure is maintained at a sufficiently high level thus preventing problems with respect to strength for withstanding fluid pressure. The plate thickness t1 and the plate thickness t2 may be the same or alternatively, may differ.

The disc-shaped piston 2A is formed by first punching or cutting out a disk shaped blank from flat plate material, such as sheet metal, then deforming the blank by pressing to form the disc-shaped piston 2A, and the shaving off the portions of the flat annular portion 12A and the annular rim portion 13A to reduce the thickness thereof.

The plate thicknesses t1 and t2 of the flat annular portion 12A and the annular rim portion 13A, respectively, are preferably in the range from 50 to 80% of the plate thickness t3 of the disc-shaped plate 11. If the plate thickness t2 of annular rim portion 13A is less than 50% of the thickness t3, then the strength for adequately supporting the torsion springs 4 may be compromised. If the thickness exceeds 80%, the effect of reducing the rigidity in the flat annular portion 12A is insufficient. If the plate thickness of the flat annular portion 12A is less than 50%, there may be problems such as the strength of the flat annular portion 12A dropping markedly. If the plate thickness exceeds 80%, the effect of reducing the rigidity in the flat annular portion 12A is insufficient.

In the second embodiment, the plate thicknesses t1 and t2 of the flat annular portion 12A and the annular rim portion 13A are thinner than the thickness t3 of the disc-shaped plate 11. Alternatively, making only one of the thicknesses t1 and t2 of the flat annular portion 12A and annular rim portion 13A, respectively, thinner is similarly effective in reducing the rigidity of the flat annular portion 12A.

Third Embodiment

Figure 8:
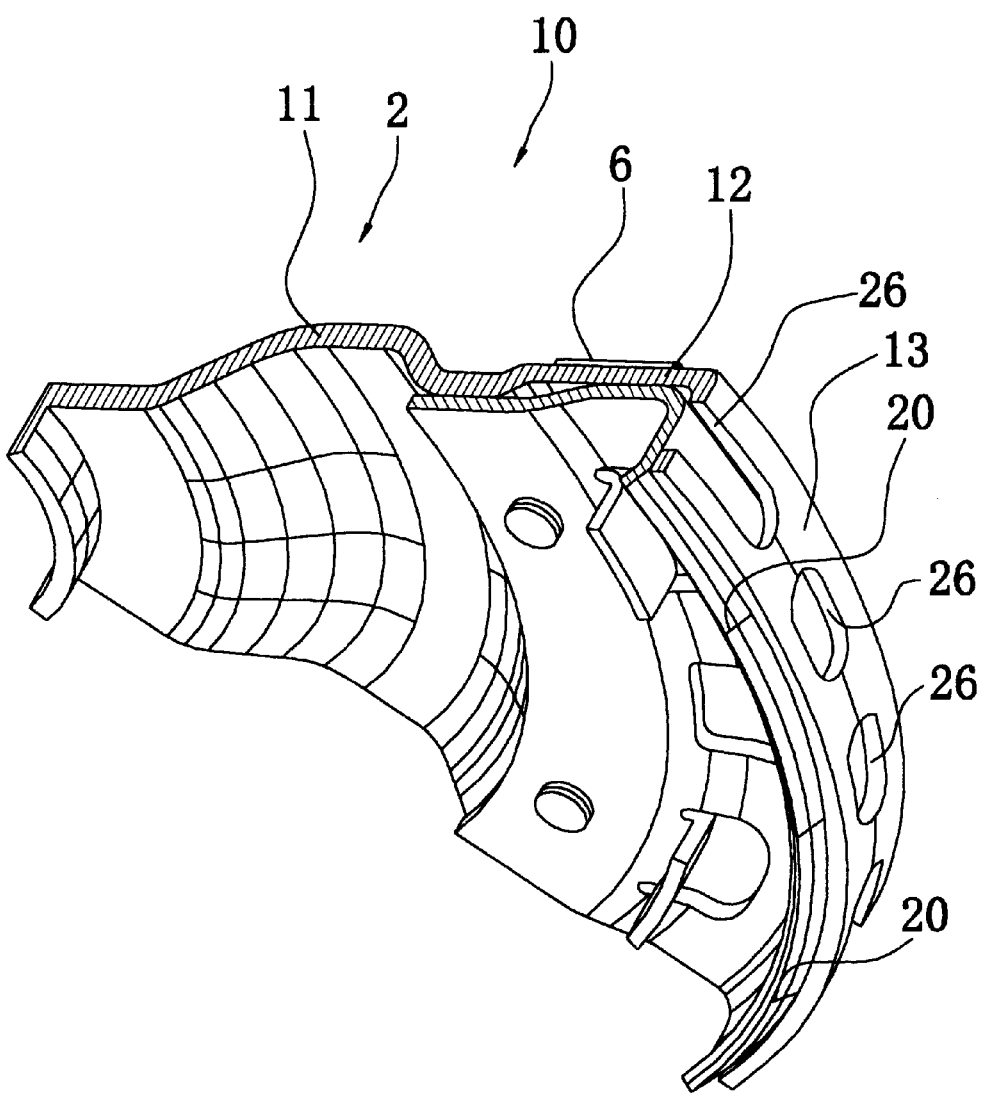
FIG. 8 is a fragmentary perspective view of portions of the lock-up clutch in accordance with a third embodiment the present invention.

A lock-up clutch in accordance with a third embodiment is described below with reference to FIG. 8. In the third embodiment, many of the various members are the same as those in described above with respect to the first embodiment, and therefore such descriptions have been omitted. Like reference numerals are used for elements common to both the first embodiment and this third embodiment.

In the third embodiment, holes 26 are formed in the annular rim portion 13 and have generally the same effect as the notches 14 in the first embodiment. In other words, there are no notches 14 in the third embodiment, but instead, a plurality of holes 26 are formed in the annular rim portion 13 in order to provide the flat annular portion 12 with a greater degree of flexibility, compared to prior art configurations. The holes 26 extend between opposite radial sides of the annular rim portion 13.

In the third embodiment, unlike the notches 14 of the first embodiment, the holes 26 are closed. In other words, the notches 14 of the first embodiment are open toward the transmission side, whereas, the holes 26 are closed on the transmission side. The holes 26 are circumferentially aligned with respect to the annular rim portion 13. Each hole 26 is located circumferentially between adjacent slits 20. The holes 26 have an oblong shape extending in the circumferential direction. An axial length of each oblong hole 26 is preferably in the range from 20 to 70% of the axial length of the annular rim portion 13. If the axial length of the holes 26 is less than 20%, the rigidity of the flat annular portion 12 cannot be sufficiently reduced. If the length exceeds 70%, the concern is the strength of the annular rim portion 13 may be compromised.

The sum of the circumferential length of all of the holes 26 is in the range from 50 to 80% of the circumferential length (360 degrees) of the annular rim portion 13. It should be clear, therefore, that the holes 26 have a longer circumferential length than the notches 14 of the first embodiment.

Fourth Embodiment

Figure 9:
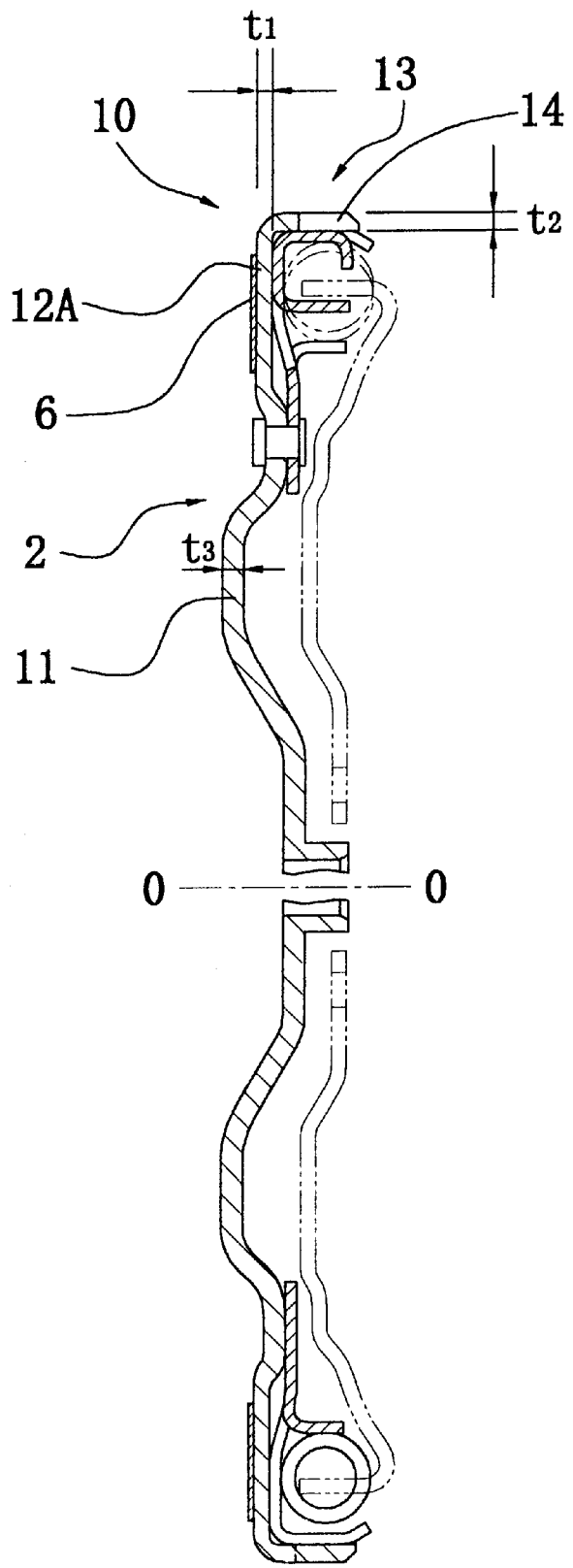
FIG. 9 is a fragmentary perspective view of portions of the lock-up clutch in accordance with a fourth embodiment of the present invention.

A fourth embodiment of the present invention is described below with reference to FIG. 9. In the lock-up clutch according to the fourth embodiment, the annular rim portion 13 is formed with the notches 14 in a manner generally the same as described above in the first embodiment. However, in the fourth embodiment, the plate thickness t1 of the flat annular portion 12A is less than the plate thickness t3 of the disc-shaped plate 11. Further, the plate thickness t2 of the annular rim portion 13 is almost identical to the plate thickness t3 of the disc-shaped plate 11.

With the reduced thickness t1 of the flat annular portion 12A in combination with the notches 14 in the annular rim portion, the fourth embodiment provides the same effect as the previous embodiments. Specifically, in the fourth embodiment, the rigidity of the flat annular portion 12A is reduced due to the reduction in the thickness t1, and the rigidity of the flat annular portion 12A is further reduced due to the notches 14 in the annular rim portion 13.

The disc-shaped piston 2 is formed by punching or cutting out a disc-shaped blank from a plate material, such as sheet metal, deforming blank to form the various contours and shape of the piston 2, and finally shaving the flat annular portion 12A to reduce the thickness thereof.

Alternate Embodiment

In the first, second, third and fourth embodiments described above, the annular rim portions 13 and 13A of the piston along with the retaining plate 3, support the radially outwardly directed loads produced in the torsion springs as a result of centrifugal forces. However, the annular rim portion of the piston can support the torsion springs directly or via another member.

Although the lock-up clutches in first, second, third and fourth embodiments have specific numbers and orientations of torsion springs, notches, holes, and slits in each, the present invention is not to limit the depicted configurations. In particular, if the holes 26 and notches 14 may be positioned such that they are circumferentially offset from the slits. Further, a plurality of notches may alternatively be provided between circumferentially adjacent slits. The shapes of the holes and notches are not limited to those depicted in FIGS. 1–9.

Effect of the Invention

In all of the above embodiments, the flat annular portion of the piston has a lower rigidity than the central disc-shaped plate portion of the piston. Therefore, the lock-up clutch piston in a torque converter according to the present invention enables the flat annular portion to engage the adjacent frictional surface of the front cover more closely when the clutch is engaged, thereby improving the friction performance. In addition, because the central disc-shaped plate portion of the piston can maintain the same rigidity as that of a conventional disc-shaped plate, the strength of the piston against the hydraulic pressure is not significantly affected.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A lock-up clutch piston for a lock-up clutch of a torque converter disposed in the torque converter between a front cover and a turbine of the torque converter, said lock-up clutch piston being adapted to move in axial directions in response to changes in hydraulic fluid pressure, said lock-up clutch piston comprising:

a disc-shaped member having a central disc-shaped plate portion;

a flat annular portion formed on an outer periphery of said disc-shaped plate, said flat annular portion being adapted to make frictional contact with the front cover;

said disc-shaped member further including an annular rim portion formed at an outer peripheral edge of said flat annular portion, said annular rim portion extending axially towards the turbine for providing radial outer support for torsion springs of the lock-up clutch;

said flat annular portion having a lower rigidity than said disc-shaped plate portion; and said flat annular portion having a thickness that is thinner than a thickness of said disc-shaped plate portion, the thickness of said flat annular portion being in the range of 50 to 80% of the thickness of said disc-shaped plate portion.

2. A lock-up clutch piston for a lock-up clutch of a torque converter disposed in the torque converter between a front cover and a turbine of the torque converter, said lock-up clutch piston being adapted to move in axial directions in response to changes in hydraulic fluid pressure, said lock-up clutch piston comprising:

a disc-shaped member having a central disc-shaped plate portion;

a flat annular portion formed on an outer periphery of said disc-shaped plate, said flat annular portion being adapted to make frictional contact with the front cover;

said disc-shaped member further including an annular rim portion formed at an outer peripheral edge of said flat annular portion, said annular rim portion extending axially towards the turbine for providing radial outer support for torsion springs of the lock-up clutch;

said flat annular portion having a lower rigidity than said disc-shaped plate portion;

said flat annular portion having a thickness that is thinner than a thickness of said disc-shaped plate portion;

a thickness of said annular rim portion being thinner than the thickness of said disc-shaped plate portion; and the thickness of said annular rim portion being in the range of 50 to 80% of the thickness of said disc-shaped plate portion.

* * * * *